United States Patent [19]

Maitland et al.

[11] 4,403,167

[45] Sep. 6, 1983

[54] SEGMENTED DISCHARGE TUBE DEVICES

[75] Inventors: Arthur Maitland, St. Andrews, Scotland; Hugh Menown, Writtle; Ian A. Strudwick, Chelmsford, both of England

[73] Assignee: English Electric Valve Company Limited, Chelmsford, England

[21] Appl. No.: 224,644

[22] Filed: Jan. 13, 1981

[30] Foreign Application Priority Data

Jan. 15, 1980 [GB] United Kingdom ............... 8001240

[51] Int. Cl.³ .................................... H01J 17/00
[52] U.S. Cl. ................................. 313/632; 313/46; 313/611; 313/634
[58] Field of Search ............... 313/195, 196, 197, 204

[56] References Cited

U.S. PATENT DOCUMENTS

| | | | |
|---|---|---|---|
| 3,599,107 | 8/1971 | Knudsen et al. | 313/204 |
| 3,705,999 | 12/1972 | Hermann et al. | 313/197 |
| 3,848,150 | 11/1974 | Taxil et al. | 313/204 |

*Primary Examiner*—Bruce C. Anderson
*Attorney, Agent, or Firm*—Spencer & Kaye

[57] ABSTRACT

A segmented discharge tube device is provided, particularly for the discharge tube of a laser, in which a number of electrically isolated aluminium segments presenting a passage through which plasma may pass are located within an aluminium tube with heat conductive electrically insulating material in the form of anodization between the outer surfaces of the segments and the adjacent inner surfaces of the tube.

15 Claims, 2 Drawing Figures

SEGMENTED DISCHARGE TUBE DEVICES

This invention relates to segmented gas discharge tube devices and in particular to segmented gas discharge tube devices for lasers.

Typically such a discharge tube device has an envelope which contains a gas at pressure which is different from that of the environmental atmosphere and so the envelope is sealed so as to be isolated from the environmental atmosphere. The segments usually of circular section are made from a refractory material such as tungsten, tantalum, molybdenum, or graphite, and are mounted coaxially within a quartz tube which constitutes the major component of the envelope providing the isolation. The segments must be of a diameter which enables them to cool radiatively since in order to accomodate the differential thermal expansion the fit of a segment within the quartz tube is slack which precludes cooling by conduction through regions of contact between quartz and segment since these areas are too small. The metals tungsten, tantalum, and molybdenum are chosen because they can be heated to the temperatures necessary for radiative cooling (1200° K.) but they are dense and not very resistant to sputtering. Use of graphite for segments has the disadvantage of producing dust which can lead to contamination of the laser window surfaces. In summary, segmented discharge tube devices as at present known tend to be heavy and fragile or dusty and fragile and therefore require special precautions in packing, transport and use.

The present invention seeks to provide an improved segmented discharge tube device in which the above difficulties are mitigated.

According to this invention a segmented discharge tube device comprises a plurality of electrically isolated metal segments presenting a passage through which plasma may pass, said segments being located in a tube with heat conductive electrically insulating material between the outer surfaces of said segments and adjacent inner surface areas of said tube.

Said tube may itself be formed of a plurality of individual lengths, each containing a segment, in which case preferably said individual lengths are of Kovar or copper and said segments are of aluminium.

Preferably however said tube is fomed of a continuous length of tube containing a plurality of segments, in which case preferably both said tube and said segments are of aluminium.

Said heat conductive electrically insulating material may be provided either on each segment, or on the interior of the tube or individual lengths thereof, but preferably said material is provided both on each segment and on the interior of the tube or individual lengths thereof.

A number of different materials are suitable for said heat conductive electrically insulating material, P.T.F.E. for example, but preferably, where the surface on which the material is provided is aluminium, said heat conductive electrically insulating material comprises anodization and preferably again anodization over which is provided a coating of high temperature polyimide varnish. A suitable varnish for this purpose is that available under the designation Pyre-M.L. Type RK-692.

Ideally said material should have a thickness sufficient to provide electrical insulation but sufficiently thin as to allow the segments, as they are heated in operation by gas discharge along their axis, to cool by transmitting heat to the tube which, preferably, is arranged to be water cooled.

In the interests of obtaining intimate contact between the segments and the envelope and thus optimum heat conduction, preferably said segments are fitted within said tube by shrink or expansion (of the tube) fitting during construction.

Preferably said discharge tube device is provided with an anode having the form of a cylindrical sleeve fitted within said tube in an insulated fashion with heat conductive electrically insulating material between the outer surface of said sleeve and the adjacent inner surface area of said tube.

Preferably again said discharge tube device is provided with a cathode within a cathode shield which shield is fitted within said tube in an insulated fashion with heat conductive electrically insulating material between the outer surface of said cathode shield and the adjacent inner surface of said tube.

Preferably said discharge tube device is a discharge tube of a laser.

Preferably said segments and where appropriate said anode and cathode sleeves are insulated and spaced from one another by short cylindrical spacers of alumina.

The invention is illustrated in and further described with reference to the accompanying drawings which show two embodiments of the present invention.

Figure 1:
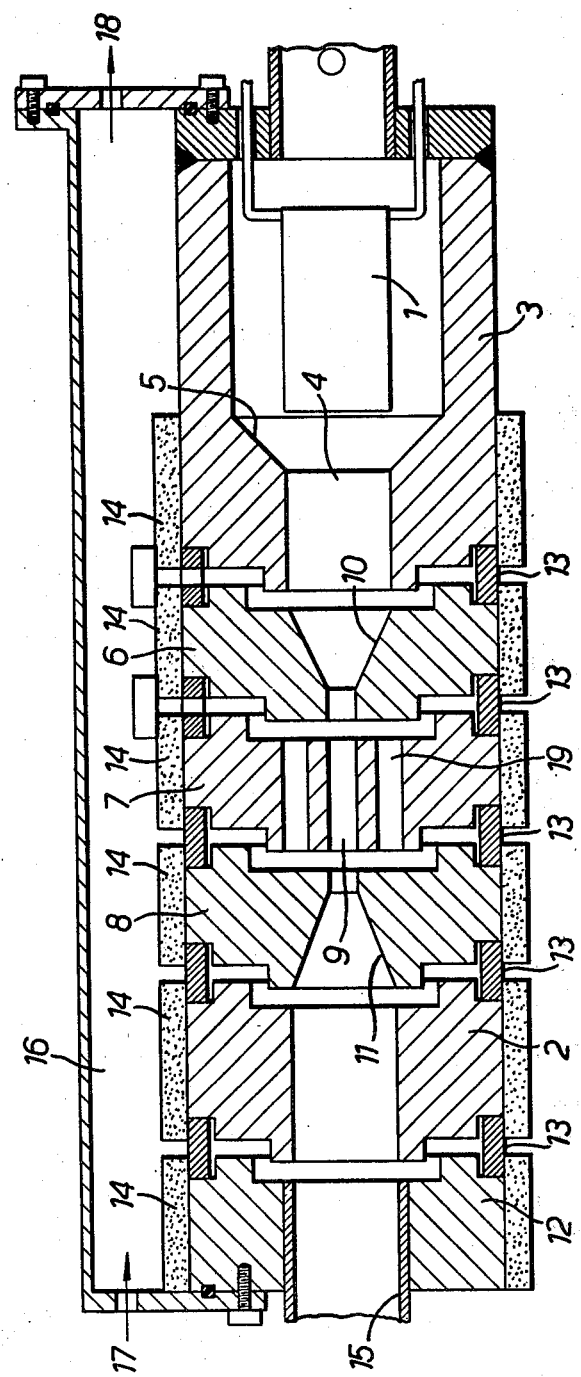
FIG. 1 is a cross-sectional side view of a first embodiment of a discharge tube device according to the invention.

Referring to FIG. 1, the discharge tube device comprises a cathode 1 at one end and an anode 2 in the form of a cylindrical sleeve at the other end of the tube. The cathode 1 is enclosed within a cylindrical sleeve 3 the interior of which forms a cavity housing the cathode 1 with an outlet 4 having a taper 5.

Between the cathode 1 and the anode 2 are a plurality of mutually insulated cylindrical segments of aluminium referenced 6, 7 and 8. An axial bore hole 9 passes through the center of each of the segments 6, 7 and 8. The segment 6 nearest the cathode 1 has a taper 10 leading into the axial bore hole 9 and segment 8 nearest the anode has a similar taper 11 leading out from the bore hole 9. The object of providing the tapers is to effect a smooth transition from regions of low current density to regions of high current density within the bore hole 9 and vice versa.

The cathode cylindrical sleeve 3 the segments 6, 7 and 8 the anode sleeve 2 and an output cylindrical flange 12 (also of aluminium) are mutually spaced by alumina rings 22. The separate parts of the device so far described are held together by Kovar sleeves 14 into which the aluminium components 3, 6, 7, 8, 2 and 12 are shrunk or expansion fitted. The sleeves 14 in effect form individual lengths of a tube.

In order to ensure electrical insulation and good thermal conductivity between the aluminium components 3, 6, 7, 8, 2 and 12 and the sleeves 14 the outer surfaces of the aluminium components adjacent the inner surfaces of the sleeves 14 are prior to assembly anodized and the anodization thus formed is covered by a coating of high temperature polyimide varnish. During assembly the aluminium components with their coatings of heat conductive electrically insulating material are cooled in liquid nitrogen and the thickness of each Kovar sleeve and the clearance between it and the aluminium component is chosen such that the expansive force exerted on the sleeve or aluminium component does not expand the sleeve in any way which would give the sleeve material an expansion co-efficient equivalent to that of the aluminium.

Fitted within the output cylindrical flange 12 is an aluminium tube 15 which is shown broken away. To the left as viewed the tube 15 in practice continues to a T-junction (not shown) of which the "leg" is used for pumping during the normal conditioning process. While not shown in the drawing the tube 15 ends in two flanges with sealing bellows between them with the second flange holding an output mirror. Surrounding the segmented tube and co-axial therewith is a water jacket 16 having a water inlet 17 and a water outlet 18 by means of which cooling water may be passed.

While only one intermediate segment 7 is shown in practice there will usually be up to 50 or more, each similar. Each intermediate segment has gas return channels 19 located near the outer radius of the segment. The purpose of the intermediate segments is to confine the plasma which provides the amplification required for laser operation. Typically from a given diameter at the middle one of the intermediate segments, the bore diameters increase from segment to segment outwardly in both directions so that the diameter of the bore hole 9 is greater at either end than it is in the centre. The taper effect may be stepped (i.e. with the bore diameter in each segment a constant through that segment) or smoothly tapered throughout. The taper is designed to give propagation in the $TEM_{oo}$ mode. The purpose of the two gas return channels such as 19 provided for each intermediate segment is to minimise the gas pumping effects occurring at each segment. The radial axes defined by the channels are arranged so that each axis is at 90° to the axis on its neighbouring segment in order to discourage the gas discharge from running down the channels instead of through the bore hole 9.

The gaps between the segments are stepped so that the alumina rings 13 do not have a direct line of sight relationship with the plasma. In addition stepping the gaps between the segments provides shielding of the alumina rings 13 from charged particles.

Figure 2:
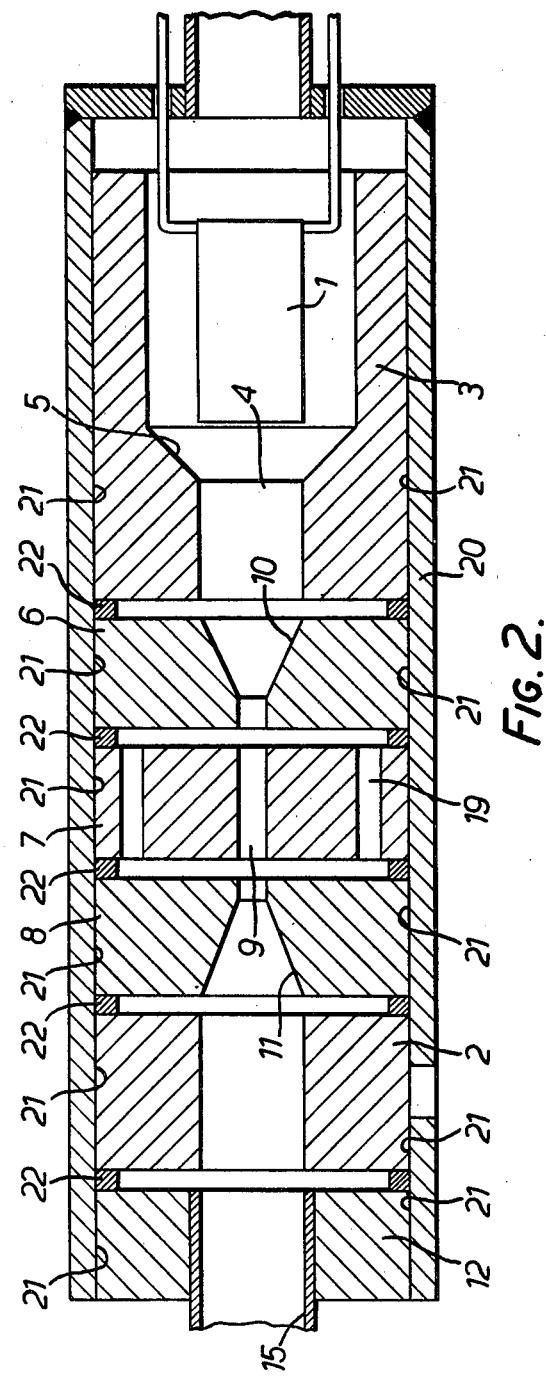
FIG. 2 is a cross-sectional side view of a second embodiment of a discharge tube device according to the invention.

Referring to FIG. 2 again the cathode 1 is mounted within a cylindrical aluminium cathode sleeve 3. The anode 2 again consists of a cylindrical aluminium sleeve and between the cathode 1 and the anode 2 is a series of segments 6, 7 and 8. Again it will be noted that the outermost segments 6 and 8 have tapered entrances to the bore hole 9 and again while only one intermediate section 7 is shown in practice there will usually be many more arranged serially, each having gas return channels 19 as previously described.

The cathode sleeve 3, the anode sleeve 2 and the intermediate segments 6, 7 and 8 are all shrunk fitted within a common continuous aluminium tube 20. In manufacture mounting of the aluminium components 2, 3, 6, 7 and 8 within the tube 20 would normally be carried out by cooling the components in liquid nitrogen.

Again in order to maintain electrical insulation and provide optimum heat conduction between the cathode sleeve 3, the anode sleeve 2 and the segments such as 6, 7 and 8 the interior surface 21 of the aluminium tube 20 and the exterior surface of the cathode sleeve 3 the anode sleeve 2 and the segments such as 6, 7 and 8 are anodized as known per se, and the anodization covered with a high temperature polyimide varnish.

Acting to space and insulate cathode sleeve 3 the anode sleeve 2 and the segments 6, 7 and 8 one from another are short cylindrical spacers 22 of alumina.

Although a water jacket is not shown, one may be provided as illustrated in FIG. 1. Also the bore hole 9 may be tapered through the segments 6, 7 and 8 and the gaps between the cathode sleeve 3, the anode sleeve 2 and the segments 6, 7 and 8, staggered as previously described with reference to FIG. 1.

We claim:

1. A segmented discharge tube device comprising a plurality of electrically isolated metal segments presenting a passage through which plasma may pass, said segments being located in a heat conductive tube with heat conductive, electrically insulating material between the outer surfaces of said segments and adjacent inner surface areas of said tube, said material contacting said inner surface areas, and anode means and cathode means at opposite ends of said plurality of segments.

2. A device as claimed in claim 1 and wherein said tube is itself formed of a plurality of individual lengths, each containing a segment.

3. A device as claimed in claim 2 and wherein said individual lengths are of Kovar or copper and said segments are of aluminium.

4. A device as claimed in claim 1 and wherein said tube is formed of a continuous length of tube containing a plurality of segments.

5. A device as claimed in claim 4 and wherein both said tube and said segments are of aluminium.

6. A device as claimed in claim 1 and wherein said heat conductive, electrically insulating material is provided both on each segment and on the interior of the tube or individual lengths thereof.

7. A device as claimed in claim 1 wherein the surface on which the material is provided is aluminium and wherein said heat conductive electrically insulating material comprises anodization.

8. A device as claimed in claim 7 and wherein said heat conductive, electrically insulating material comprises anodization over which is provided a coating of high temperature polyimide varnish.

9. A device as claimed in claim 1 and wherein said tube is arranged to be water cooled.

10. A device as claimed in claim 1 and wherein said segments are fitted within said tube by shrink fitting during construction.

11. A device as claimed in claim 1 or wherein said segments are fitted within said tube by expansion (of the tube) during construction.

12. A device as claimed in claim 1 wherein said anode means comprise an anode having the form of a cylindrical sleeve fitted within said tube in an insulated fashion with heat conductive, electrically insulating material between the outer surface of said sleeve and the adjacent inner surface area of said tube.

13. A device as claimed in claim 12 wherein said cathode means comprise a cathode within a cathode shield which shield is fitted within said tube in an insulated fashion with heat conductive, electrically insulating material between the outer surface of said cathode shield and the adjacent inner surface of said tube.

14. A device as claimed in claim 1 and comprising the discharge tube of a laser.

15. A device as claimed in claim 13 and wherein said segments and said anode and cathode sleeves are insulated and spaced from one another by short cylindrical spacers of alumina.

* * * * *